US008996358B2

(12) United States Patent
Crestani Campos et al.

(10) Patent No.: US 8,996,358 B2
(45) Date of Patent: Mar. 31, 2015

(54) ENTITY VARIANT GENERATION AND NORMALIZATION

(75) Inventors: Adriano Crestani Campos, Ottawa (CA); Yunyao Li, San Jose, CA (US); Sriram Raghavan, Koramangala (IN); Huaiyu Zhu, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 13/481,666

(22) Filed: May 25, 2012

(65) Prior Publication Data

US 2013/0317806 A1 Nov. 28, 2013

(51) Int. Cl.
*G10L 15/00* (2013.01)
*G06F 17/27* (2006.01)

(52) U.S. Cl.
CPC .................................. *G06F 17/278* (2013.01)
USPC .............................................. 704/7; 707/708

(58) Field of Classification Search
None
See application file for complete search history.

(56) References Cited

U.S. PATENT DOCUMENTS

| 6,963,871 | B1 | 11/2005 | Hermansen et al. |
| 7,398,201 | B2* | 7/2008 | Marchisio et al. ................. 704/9 |
| 7,783,668 | B2 | 8/2010 | Vogel et al. |
| 7,848,918 | B2 | 12/2010 | Li et al. |
| 7,917,497 | B2* | 3/2011 | Harrison et al. .............. 707/713 |
| 8,041,702 | B2 | 10/2011 | Eggebraaten et al. |
| 8,676,820 | B2* | 3/2014 | Vailaya et al. ................. 707/755 |
| 2003/0233224 | A1* | 12/2003 | Marchisio et al. ................. 704/4 |
| 2011/0010353 | A1 | 1/2011 | Wei et al. |

OTHER PUBLICATIONS

Elmagarmid, A.K. et al., "Duplicate Record Detection: A Survey," IEEE Transactions on Knowledge and Data Engineering, Jan. 2007, pp. 1-16, vol. 19, No. 1, IEEE Computer Society, United States.
Brizan, D.G. et al., "A Survey of Entity Resolution and Record Linkage Methodologies," Communications of the IIMA, 2006, pp. 41-50, vol. 6, No. 3, International Information Management Association, United States.
U.S. Non-Final Office Action for U.S. Appl. No. 13/595,241 mailed Jun. 23, 2014.
U.S. Non-Final Office Action for U.S. Appl. No. 13/595,241 mailed Nov. 17, 2014.

* cited by examiner

*Primary Examiner* — Daniel D Abebe
(74) *Attorney, Agent, or Firm* — Sherman IP LLP; Kenneth L. Sherman; Steven Laut

(57) ABSTRACT

Determining variants of a text entity comprises parsing the text entity into semantic components and generating variants for each of the semantic components. The entity is recomposed in different morphological forms from the different variants of the semantic components.

11 Claims, 5 Drawing Sheets

ENTITY VARIANT GENERATION AND NORMALIZATION

BACKGROUND

Typically identification of an entity can be presented in different linguistic forms. For example, the company "International Business Machines Corporation" is typically referred to as "IBM Corporation" or simply "IBM." The existence of different morphological forms for the same entity can occur in queries or in documents and poses great challenges for search engines both at the search phase and at the result presentation phase.

At the search phase, a query posed by the user to search for an entity in an information retrieval system may be different from how that entity is described/identified in the underlying data. For example, when the user searches for the person "Fred Doe", the name of that person in underlying data may be "Frederick Doe." As such, the search engine needs to recognize that "Frederick Doe" is a good match for "Fred Doe" in order to provide the right results back to the user. Otherwise, the search engine may return less relevant results to the user.

BRIEF SUMMARY

Embodiments of the invention relate to entity variant generation and normalization. In one embodiment, determining variants of a text entity comprises parsing the text entity into semantic components and generating variants for each of the semantic components. The entity is recomposed in different morphological forms from the different variants of the semantic components.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. One or more exemplary embodiments of the invention are described below in detail. The disclosed embodiments are intended to be illustrative only since numerous modifications and variations therein will be apparent to those of ordinary skill in the art.

Embodiments of the invention relate to entity variant generation and normalization. In one embodiment, the invention provides knowledge-rich intelligent programmable entity variant generation and normalization, for querying information in an information retrieval system such as a search engine in an information technology environment. An example query comprises text such as one or more alphanumeric letters and/or words.

An identification of an entity is parsed into semantic components based on the type of the entity and optionally auxiliary information. Variants are generated for each of the semantic components and recomposed back into different morphological forms or normalization form of the original entity based on user programming/configuration and auxiliary information.

Figure 1:
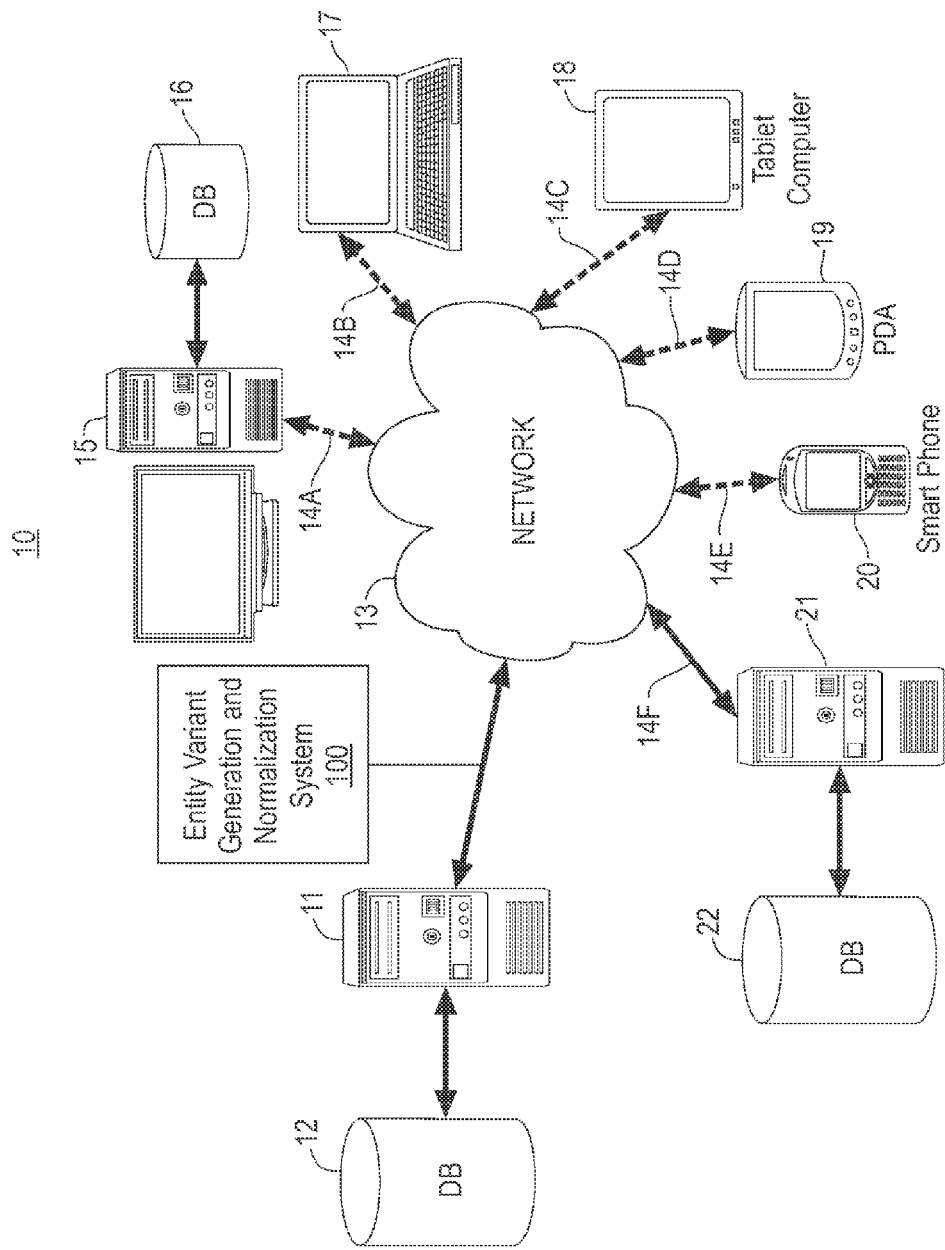
FIG. 1 is a block diagram illustrating an example of a network environment for entity variant generation and normalization, according to an embodiment of the present invention.

Referring now to the drawings, FIG. 1 illustrates an example of the basic components of an information technology system 10 utilizing an entity variant generation and normalization system 100 that implements an entity variant generation and normalization for information retrieval using search queries, according to an embodiment of the present invention. The information technology system 10 includes a server 11 and remote devices 15 and 17-20 that may utilize the system 100 of the present invention. In one embodiment, the server 11 implements an information retrieval system 5 (FIG. 2) that utilizes the system 100 of the present invention.

Each of the remote devices 15 and 17-20 has applications and can have a local database 16. Server 11 contains applications, and is connected to a database 12 that can be accessed by remote devices 15 and 17-20 via connections 14(A-F), respectively, over a network 13. The server 11 executes software for a computer network and controls access to itself and database 12. The remote devices 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like, or other like networks. The server 11 may also be connected to the local area network (LAN) within an organization.

The remote devices 15 and 17-20 may each be located at remote sites. Remote devices 15 and 17-20 include but are not limited to, PCs, workstations, laptops, handheld computers, pocket PCs, PDAs, pagers, WAP devices, non-WAP devices, cell phones, palm devices, printing devices and the like. Included with each remote device 15 and 17-20 is an ability to request relevant material from a large collection of documents via search queries to the server 11. Thus, when a user at one of the remote devices 15 and 17-20 desires to access the system 100 and the database 12 at the server 11, the remote device 15 and 17-20 communicates over the network 13, to access the system 100, the server 11 and database 12.

Third party computer systems 21 and database 22 can be accessed by the server 11 in order to provide access to additional collections of documents and/or search indexes. Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
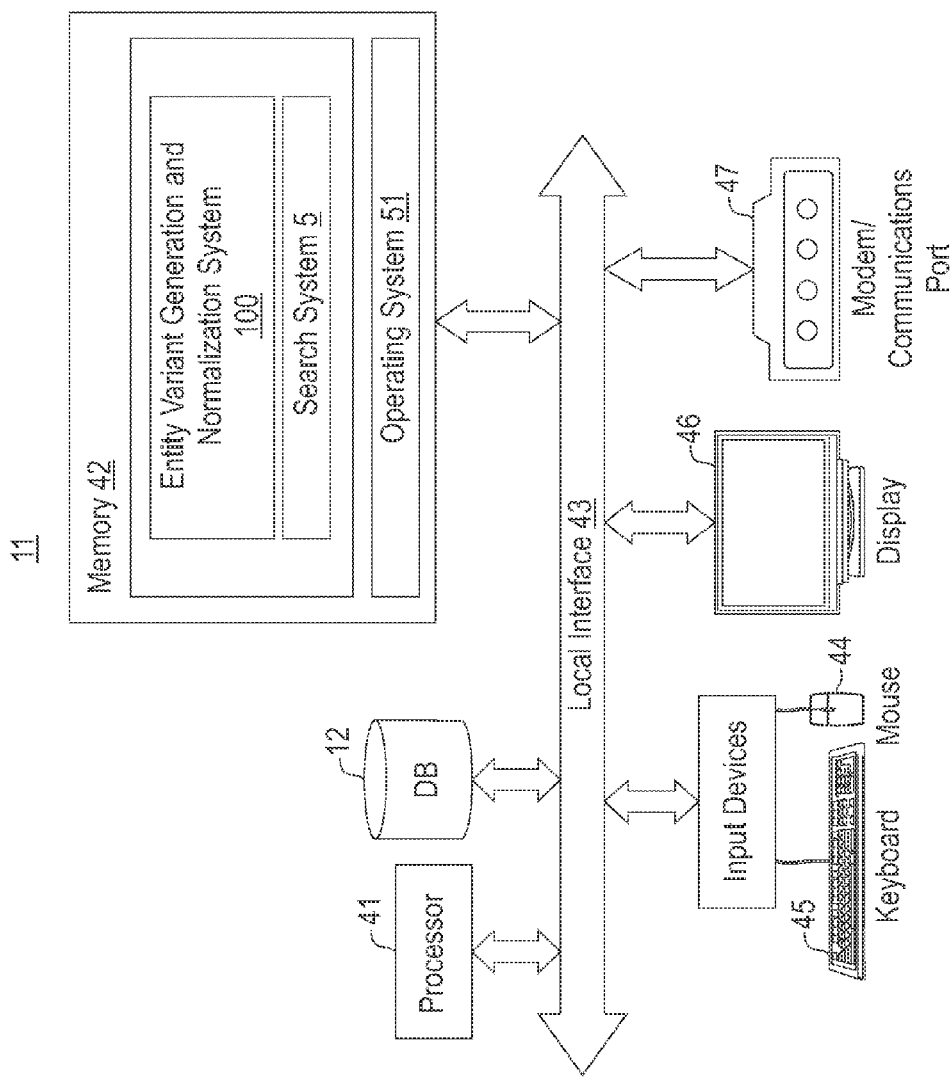
FIG. 2 is a block diagram illustrating an example of a server including a system utilizing entity variant generation and normalization, according to an embodiment of the present invention, as shown in FIG. 1.

The system 100 utilizes said an entity variant generation and normalization process, according to an embodiment of the invention. Illustrated in FIG. 2 is a block diagram demonstrating an example of server 11, as shown in FIG. 1, utilizing the system 100 according to an embodiment of the present invention. The server 11 includes, but is not limited to, PCs, workstations, laptops, PDAs, palm devices and the like. The processing components of the third party computer systems are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a RF or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

When the system 100 is implemented in software, as is shown in FIG. 2, it should be noted that the system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote devices 15 and 17-20 are similar to the description of the components for server 11 described with regard to FIG. 2. The remote devices 15 and 17-20 are referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to an embodiment of the invention, an entity variant generation and normalization process implemented by the system 100 comprises determining entity variants of an entity in a query by parsing a mention of an entity into semantic components. In one example, semantic components may be determined via domain ontology. In one example, the parsing is based on the type of entity and auxiliary information. In one example, parsing can also be based on (influenced by) user configuration.

In one embodiment, variants for each of the semantic components are generated. The entity is recomposed in different morphological forms from the different variants of the semantic components. In one example, auxiliary information may comprise common dictionaries, such as stop word lists, prefix lists, antecedent words list, etc. Different semantic components can be included or excluded when combining the different variants.

Figure 3:
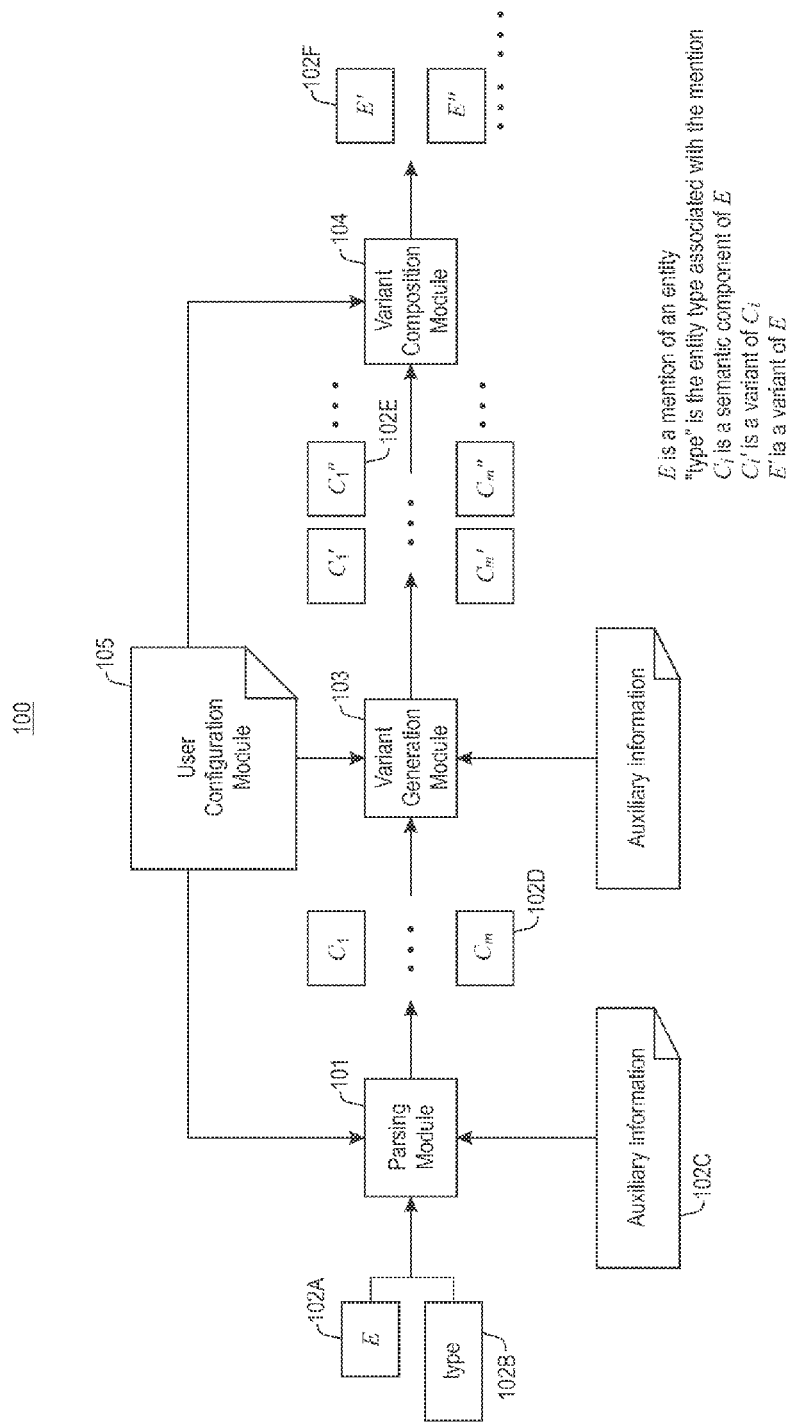
FIG. 3 shows a block diagram of an entity variant generation and normalization system, according to an embodiment of the present invention.

FIG. 3 shows an implementation of the system 100 for supporting knowledge-rich intelligent programmable entity variance generation and normalization, according to an embodiment of the invention. The system 100 includes a parsing module 101 for receiving an entity record 102A and the associated entity type 102B. The parsing module 101 utilizes system-predefined and/or user supplied auxiliary information 102C to parse the entity 102A into semantic components 102D based on auxiliary information and the entity type.

A variant generating module 103 generates variants 102E for the individual semantic components. A variant composition module 104 composes the variants together into results 102F comprising complete entity forms, or one normalized form, based on user configuration information 105. In FIG. 3, E is a mention of an entity, "type" is the entity type associated with the mention, C, is a semantic component of E, Ci' is a variant of Ci, and E' is a variant of E.

Figure 4:
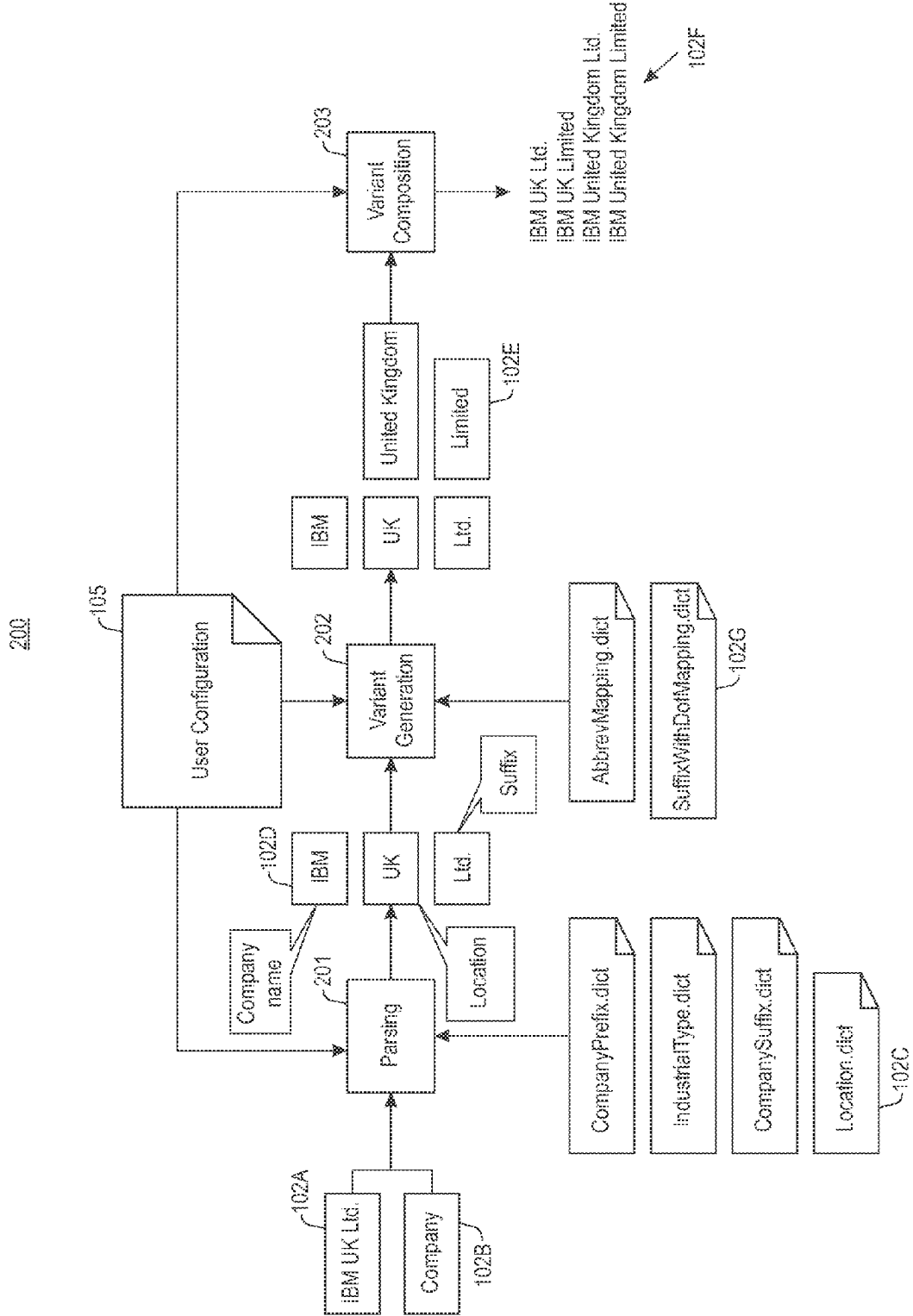
FIG. 4 shows a process for entity variant generation, according to an embodiment of the present invention.

FIG. 4 shows an example process 200 implemented by the system 100 for entity variance generation based on an example input entity record (e.g., textual query), according to an embodiment of the invention. Given an entity record instance (e.g., "IBM UK Ltd.") and the entity type associated with the record (e.g., "Company"), in process block 201 the entity record is parsed into different semantic components based on the given entity type. The possible semantic components for each entity type may be obtained via domain ontology and influenced by optional user configuration. For example, according to domain ontology a company name may be composed of <prefix>? <company name> <location>? <suffix>? <headquarter location>?<subsidiary name>?. Furthermore, a user may specify that none of the company names contains a subsidiary name.

The parsing process may refer to auxiliary information available. For the example illustrated in FIG. 4, "companyPrefix.dict" may be used as a dictionary of common prefixes in company names such as "Bank of", while "CompanySuffix.dict" may be used as a dictionary of common suffixes in company names such as "Ltd.", "Inc." or "Limited." The auxiliary information is typically not required but may facilitate the parsing process if specified. In the example illustrated in FIG. 4, "IBM" is obtained as an instance of <company name>, "UK" as an instance of <location>, and "Ltd." as an instance of <suffix>.

In process block 202, based on user configuration (and additional auxiliary information, if any), variants are generated for each of the semantic component instances. For example, with the information from "AbbrevMapping.dict", the abbreviation "IBM" can be expanded into its full form "International Business Machines". Similarly, with the information from "SuffixWithDotMapping.dict" 102G, the abbreviation "Ltd." can be expanded into its full form "Limited". The actual variants generated depend on the user configuration. For the example in FIG. 4, only the instances of <location> and <suffix> are expanded into their full forms. Further, the abbreviation for an instance of <suffix> is required to include a "." at its end. Therefore, "Ltd" is not generated as a variant for "Ltd.".

After all the variants for all the semantic components have been generated, in process 203 the variants are composed together into different morphological forms of the original entity record instance based on the user configuration. For example, if the user configuration requires all the semantic components be present in the entity variants, then "IBM UK Ltd.", "IBM UK Limited", "IBM United Kingdom Ltd." and "IBM United Kingdom Limited" are generated as variants. If the user configuration forbids the inclusion of the <location> component instances, then only "IBM Ltd." and "IBM Limited" are generated as the variants.

According to embodiments of the invention, entity variants are generated in a semantically meaningful fashion. Entity variants are fully programmable by user configuration and user provided auxiliary information. An implementation of the invention can be seamlessly integrated with the indexing pipeline of an existing search application and/or its final result presentation pipeline.

Figure 5:
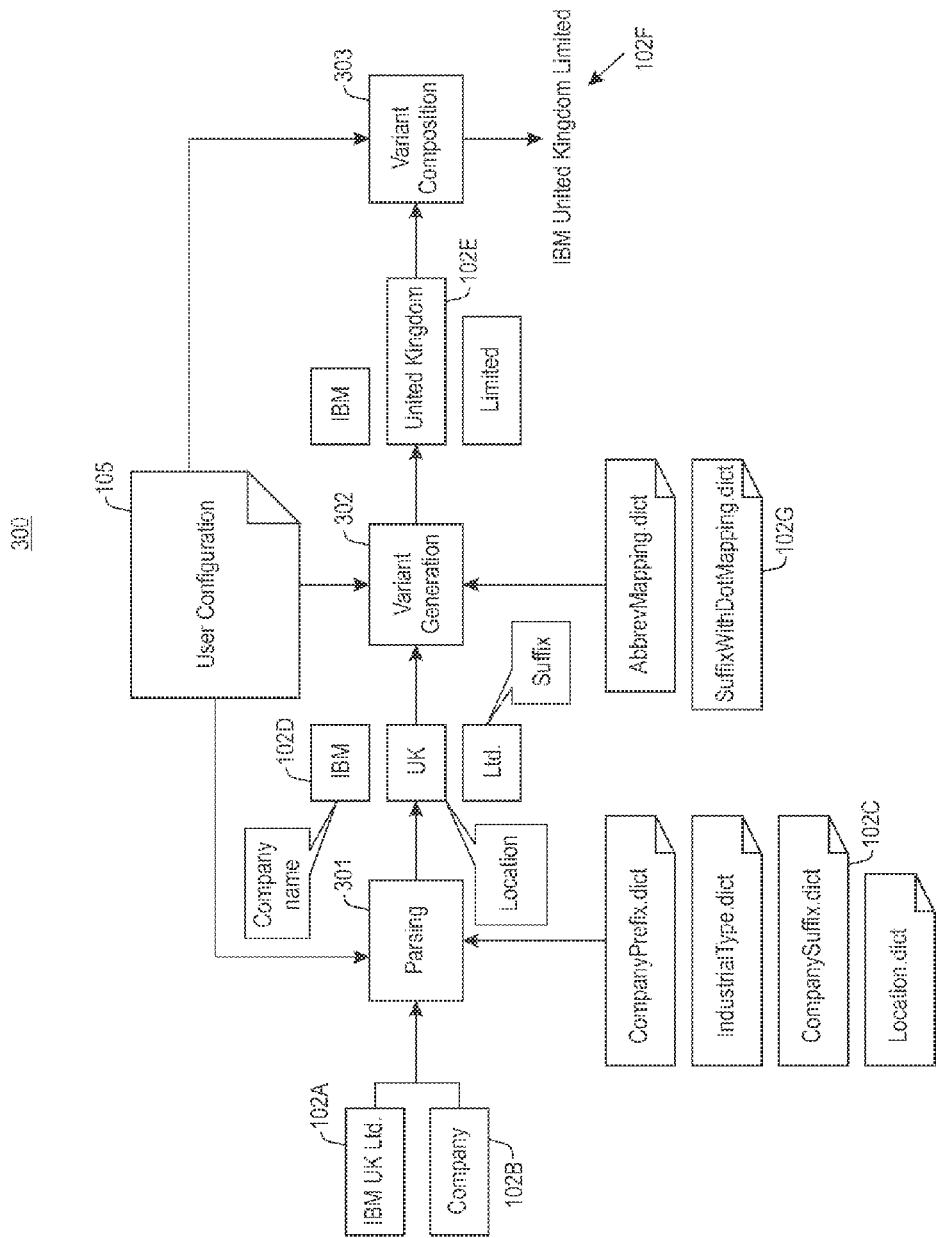
FIG. 5 shows a process for entity variant generation and normalization.

FIG. 5 shows a normalization process 300, according to an embodiment of the invention. Employing different user configurations for both semantic component variant generation and composition, embodiments of the invention obtain normalization functionality.

Given an entity record instance (e.g., "IBM UK Ltd.") and the entity type associated with the record (e.g., "Company"), in process block 301 the entity record is parsed into different semantic components based on the given entity type. The possible semantic components for each entity type may be obtained via domain ontology. For example, a company name may be composed of <prefix>? <company name> <location>? <suffix>? <headquarter location>? <subsidiary name>?.

The parsing process may refer to auxiliary information available. For the example illustrated in FIG. 5, "companyPrefix.dict" may be used as a dictionary of common prefixes in company names such as "Bank of", while "CompanySuffix.dict" may be used as a dictionary of common suffixes in company names such as "Ltd.", "Inc." or "Limited." The auxiliary information is typically not required but may facilitate the parsing process if specified. In the example illustrated in FIG. 5, "IBM" is obtained as an instance of <company name>, "UK" as an instance of <location>, and "Ltd." as an instance of <suffix>.

In process block 302, based on user configuration 105 (and additional auxiliary information, if any), variants are generated for each of the semantic component instances. For example, with the information from "AbbrevMapping.dict", the abbreviation "IBM" can be expanded into its full form "International Business Machines". Similarly, with the information from "SuffixWithDotMapping.dict", the abbreviation "Ltd." can be expanded into its full form "Limited". The actual variants generated depend on the user configuration. For the example in FIG. 5, only the instances of <location> and <suffix> are expanded into their full forms. Further, the abbreviation for an instance of <suffix> is required to include a "." at its end. Therefore, "Ltd" is not generated as a variant for "Ltd.".

After the variants for the semantic components have been generated, in process 303 the variants are composed together into a normalized form of the original entity record instance based on the user configuration. For example, based on a user configuration that requires certain semantic components be present in the entity variants, then "IBM United Kingdom Limited" is generated as a variant.

According to embodiments of the invention, when search results (e.g., results 102F) are presented to the user, the results found for different morphological forms of the same entity are grouped together.

Further, according to embodiments of the invention, in search applications, facets may be generated on the fly to help the user refine the query. Instead of overwhelming the user with many variant forms, the normalization capability of this invention can be used to present to the user a single normalized form (e.g., one facet in normalized form is presented to the user for the different morphological forms of the same entity record). A search application according to an embodiment of the invention recognizes both the existence of morphological forms and normalizes them into one form. A search application such as search engines utilizing embodiments of the invention handles morphological forms for an entity for both search and result presentation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer program product for determining variants of a text entity, the computer program product comprising a tangible storage medium readable by a computer system and storing instructions for execution by the computer system for performing a method comprising:
    parsing the text entity into semantic components;
    generating variants based on input from auxiliary information and user configuration information for each of the semantic components, wherein based on the type of entity, different semantic components for each entity type are determined based on domain ontology and the user configuration information; and
    recomposing the entity in different morphological forms from the different variants of the semantic components.

2. The computer program product of claim 1, further comprising parsing based on the type of the entity.

3. The computer program product of claim 2, further comprising determining semantic components utilizing domain ontology.

4. The computer program product of claim 1, further comprising recomposing the entity by selectively including different semantic components for combining said different variants of the semantic components.

5. The computer program product of claim 1, further comprising recomposing the entity by selectively excluding different semantic components for combining said different variants of the semantic components.

6. The computer program product of claim 1, further comprising composing the variants together into results including complete entity forms, or one normalized form, based on user configuration information.

7. The computer program product of claim 2, further comprising parsing based on user configuration.

8. The computer program product of claim 2, further comprising parsing based on the type of the entity and optionally auxiliary information.

9. The computer program product of claim 8, wherein the auxiliary information comprises one or more common dictionaries.

10. A variant determination system for determining variants of a text entity in a computing system, comprising:
    a parser that parses the text entity into semantic components based on the type of the entity;
    a variant generator that generates variants for each of the semantic components based on input from auxiliary information and user configuration information, wherein based on the type of entity, different semantic components for each entity type are determined based on domain ontology and the user configuration information; and
    a composer that recomposes the entity in different morphological forms from the different variants of the semantic components, by selectively including different semantic components for combining said different variants of the semantic components.

11. The variant determination system of claim 10, wherein:
    the parser further parses based on one or more of: auxiliary information and user configuration information; and
    the composer recomposes the entity by selectively excluding different semantic components for combining said different variants of the semantic components, wherein the composer composes the variants together into results including complete entity forms, or one normalized form, based on user configuration information.

* * * * *